United States Patent

[11] 3,586,967

| [72] | Inventors | Jean-Pierre Peyrot<br>Villejuif;<br>Marie-Therese Destribats, Orsay; Michel<br>Pigeon, Bures-sur-Yvette, all of, France |
|---|---|---|
| [21] | Appl. No. | 818,759 |
| [22] | Filed | Apr. 23, 1969 |
| [45] | Patented | June 22, 1971 |
| [73] | Assignee | Commissariat A L'Energie Atomique<br>Paris, France |
| [32] | Priority | May 7, 1968 |
| [33] | | France |
| [31] | | 150,892 |

[54] PNEUMATIC CENTERING DEVICE
8 Claims, 4 Drawing Figs.

[52] U.S. Cl. .................................................. 324/40,
324/34, 308/9
[51] Int. Cl. ..................................................G01r 33/00,
F16c 7/04, F16c 35/00
[50] Field of Search........................................... 324/37, 40,
34

[56] References Cited
UNITED STATES PATENTS

| 2,070,115 | 2/1937 | Crane............................. | 308/9 |
| 2,665,333 | 1/1954 | Dunipace et al.............. | 324/34 (T) |
| 2,928,709 | 3/1960 | Baumeister................... | 308/9 X |
| 3,023,312 | 2/1962 | Wood............................ | 324/37 X |
| 3,443,211 | 5/1969 | Wood et al. .................. | 324/37 |

OTHER REFERENCES

N. Chironis; PRODUCT ENGINEERING; Nov. 23, 1959; pp. 68— 71

Primary Examiner—Alfred E. Smith
Attorney—Craig, Antonelli, Stewart & Hill

ABSTRACT: A pneumatic centering device for the inspection of cylindrical or tubular metal parts by nondestructive methods such as eddy-current testing. The device is centered relative to the part to be tested and comprises a tubular casing fitted or integral with a projecting annular coil form. Two annular chambers are defined on each side of said coil formed between the surface of said part and the tubular casing. The annular chambers are closed by endpieces which are integral with the casing and have radial partition walls so as to form within each chamber adjacent compartments which are limited by the part to be tested. At least one aperture is provided within each chamber for the admission of compressed fluid so as to produce pneumatic cushions within the compartments of said chambers, the function of the cushions being to center the tubular casing relative to the part to be tested.

PATENTED JUN22 1971  3,586,967
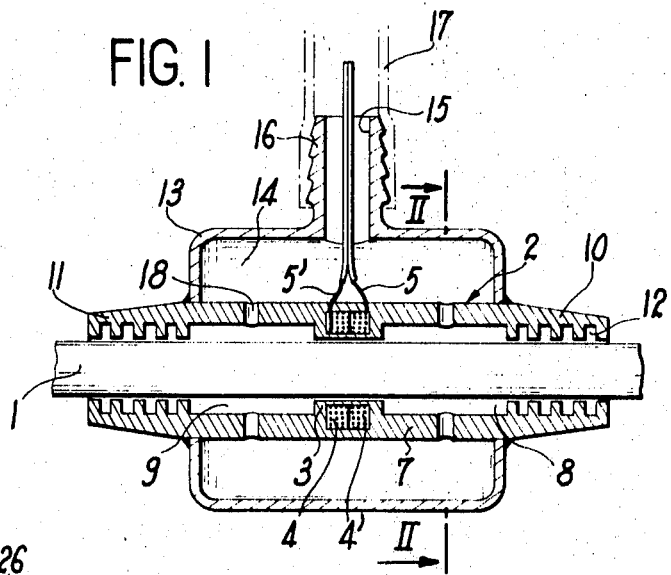
FIG. 1
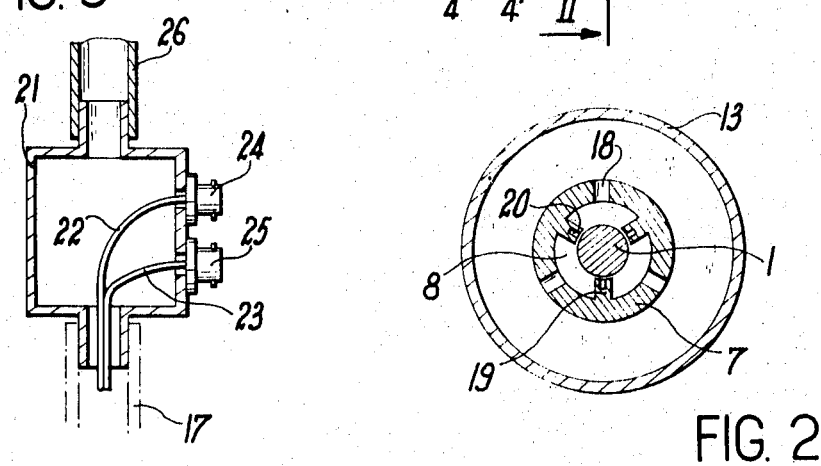
FIG. 3
FIG. 2
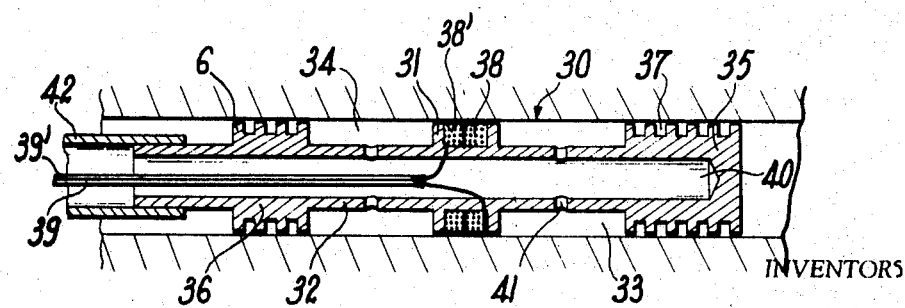
FIG. 4
INVENTORS
MARIE-THERESE DESTRIBATS,
JEAN-PIERRE PEYROT and
MICHEL PIGEON
BY
Craig, Antonelli, Stewart & Hill ATTORNEYS

PNEUMATIC CENTERING DEVICE

This invention relates to a pneumatic centering device which is primarily although not exclusively applicable to an apparatus for testing the thickness or uniformity of metallic parts in the form of tubes or rods by generating eddy currents. By means of this device, it is possible to ensure accurate and continuous alignment of the part under inspection with respect to the testing apparatus without necessitating any direct contact.

It is known that the nondestructive testing of parts and especially cylindrical parts by induction of eddy currents is carried out by means of instruments which usually comprise a probe or a measuring coil formed of a number of windings and displaced in the vicinity of the external or internal surface of the part to be tested which may be either solid or hollow, a generator for setting up a current within the coil and a unit for detecting induced currents. In practice, the use of these instruments sets a number of problems when highly accurate centering of the probe or coil with respect to the part is to be achieved, as is in fact essential for precision and reproducibility of measurement, while ensuring that the state of surface of the part is not impaired as a result of frictional contact with the test instrument.

The present invention is directed to a pneumatic device for centering an element with respect to a cylindrical member which overcomes the disadvantages mentioned above, especially by preventing any direct contact between a measuring instrument and a part to be tested.

To this end, said centering device is characterized in that it comprises a tubular casing integral with said element which defines with the surface of the cylindrical member two chambers which are preferably identical and which are closed off by two endpieces, said endpieces being integral with said casing and provided with radial partition walls forming separations within each chamber between adjacent compartments which are limited by said cylindrical member and at least one orifice for the admission to said chambers of a compressed fluid which produces within said compartments pneumatic cushions for centering said casing relative to said cylindrical member.

Advantageously, and in accordance with a further characteristic feature, said endpieces are provided with baffles in the surface located opposite to said cylindrical member so as to subject the compressed fluid to successive expansions as it passes out of said chambers. Preferably, said casing is adapted to communicate with a collecting cavity in which the chamber inlets have their openings, said cavity being connected to a pipe for the supply of compressed fluid.

In a first embodiment which is intended to permit centering with respect to the external surface of said cylindrical member, said chambers are annular and surround said member externally thereof.

In another embodiment which is intended to permit centering with respect to the internal surface of said cylindrical member which is in this case a hollow cylindrical part, said chambers are limited by the internal surface of said member, said cavity being formed in the axis of said element.

Further properties of a pneumatic centering device constructed in accordance with the invention will further become apparent from the following description of one exemplified embodiment which is given by way of indication and not in any limiting sense, reference being made to the accompanying drawings, in which:

FIG. 1 is a diagrammatic sectional view of a centering device in a first embodiment of the invention;

FIG. 2 is a sectional view taken along line II–II of FIG. 1;

FIG. 3 is a detail illustration of an ancillary component which is associated with the device of FIG. 1;

FIG. 4 is a sectional view of another embodiment.

In the example which is illustrated in FIGS. 1 and 2, the device under consideration is intended to center an apparatus 2 about a metallic part 1 in the form of a solid cylindrical rod for the nondestructive testing of said part, especially by induction followed by detection of eddy currents. This device mainly comprises an annular form 3 for a winding as illustrated diagrammatically in the drawings and formed by two electric coils 4 and 4', the ends of which are connected to a current source located externally of the device by means of two sections 5 and 5' of coaxial cable. The form 3 is rigidly fixed to a casing 7 which is mounted coaxially around the part 1 and formed in such a manner as to define two annular chambers 8 and 9 on each side of the coil form 3 between the internal surface of the casing and the external surface of the part 1. Said two annular chambers preferably have substantially the same dimensions and are closed at the ends remote from the coil form 3 by means of two endpieces 10 and 11 in which a set of baffles such as the set 12 is formed opposite to the part 1. The casing 7 is joined externally to a metallic wall 13 so as to form a cavity 14 which surrounds the casing 7 and into which opens an orifice 15 formed at the extremity of a pipe union 16 which is integral with the wall 13. The extremity of a hose 17 is fitted over said union in order to connect the apparatus to an external source (not shown) of fluid under pressure. Said orifice 15 also provides a passageway for the ends of the lead wires 5 and 6 of the coil 4. The cavity 14 is put into communication with the chambers 8 and 9 by means of ports such as the port 18 which are formed through the casing 7 so as to supply said chambers with the compressed fluid of said cavity.

It is apparent from the sectional view of FIG. 2 that each chamber 8 or 9 referred to above is divided into three adjacent compartments by means of radial partition walls 19, each wall being provided with a terminal slot 20 for limiting the expansion of the fluid as this latter flows from one compartment to the other through the intermediate space formed between the partition walls 19 and the external surface of the part 1. FIG. 3 also illustrates an ancillary component of the device which is mounted at the extremity of the hose 17 and essentially comprises a box 21 for the separation of the cables 22 and 23 which form extensions of the ends 5 and 6 of the coil 4. Said cables are connected to supply terminals 24 and 25 carried by the box 21 independently of the inlet provided for the fluid under pressure which is supplied to the pipe 17 and admitted to the box through the connecting pipe 26.

The operation of the centering device which has been described with reference to the previous figures is as follows: The supply of compressed fluid to the chambers 8 and 9 and consequently to the adjacent compartments formed within said chambers by the partition walls 19 serves to produce and to maintain air cushions within said chambers, thereby centering the form element 3 of the coil 4 with respect to the part 1 while preventing in particular any accidental contact between said part and said coil form element. In fact, any eccentric displacement results in an instantaneous reduction of pressure in at least two of the cushions, and the unbalance thus produced immediately returns the parts to their initial positions in which the resultant of the forces applied is zero. It is readily apparent that provision can be made for any desired number of compartments within the chambers.

FIG. 4 relates to another alternative embodiment in which it is sought to test the internal surface of a hollow cylindrical tube 30. In this case, the test apparatus comprises a support or coil form 31 and a casing 32, these two members being mounted in such a manner that the annular chambers 33 and 34 which are defined on each side of the support 31 should be formed between the internal surface of the part 30 and the casing 32. The chambers 33 and 34 are limited by two endpieces 35 and 36 in which are formed baffles. The coil form 31 is fitted with two electric coils 38 and 38'. The supply leads 39 and 39' of said coils are of coaxial structure and connected externally of the apparatus to a suitable current supply source. In this embodiment, compressed fluid is supplied to the chambers 33 and 34 by means of a cavity 40 which is formed axially within the coil form 31 and adapted to communicate with the chambers 33 and 34 through the casing 32 by means of ports such as the port 41. The cavity 40 is connected to an external source by means of a hose 42.

In this second embodiment, the principle of operation is similar to that which has already been described in connection with the example of FIGS. 1 and 2. The air cushions which are formed within the compartments of the chambers 33 and 34 exert pressure on the internal wall of the hollow tubular part 30 so as to cause and to maintain centering of the test apparatus with respect to the part. However, it is worthy of note that, in the case of the embodiment now under consideration, and especially when the tubular part has a small diameter, the rate of discharge of compressed fluid past the endpiece 36 must be higher than the rate of discharge past the endpiece 35 in order to ensure that the flexible hose 42 should be continuously under tension. To this end, the endpiece 35 is provided with a slightly larger number of baffles 37 than the endpiece 36.

Whatever form of construction may be adopted, the pneumatic centering device which is thus provided is based on a very simple concept. And although the device is somewhat similar in design to known fluid bearings, the difference lies in the fact that the element which delimits the fluid cushions is centered on the part to be tested whereas, in the case of fluid bearings, it is the rotating shaft which is continuously centered on the axis of said bearings. The device according to the invention also ensures self-centering of the test apparatus with respect to the part to be inspected without thereby entailing any danger of direct contact between these two elements. As a consequence, the state of surface of the part can be wholly preserved and the measurements which can thus be obtained are very accurate and perfectly reproducible.

It will naturally be understood that the present invention is not limited in any sense to the exemplified embodiments which have been described in the foregoing with reference to the accompanying drawings but extends to all alternative forms.

What we claim is:

1. A pneumatic device for centering an element with respect to a cylindrical member, characterized in that it comprises a tubular casing integral with said element which defines with the surface of the cylindrical member two chambers which are closed by two endpieces, said endpieces being integral with said casing and provided with radial partition walls forming separations within each chamber between adjacent compartments which are limited by said cylindrical member and a plurality of orifices for the admission to said chambers of a compressed fluid which produces within said compartments pneumatic cushions for centering said casing relative to said cylindrical member and wherein said endpieces are provided with baffles in the surface located opposite to said cylindrical member so as to subject the compressed fluid to successive expansions as it passes out of said chambers.

2. A pneumatic device in accordance with claim 1, characterized in that said casing is adapted to communicate with a collecting cavity in which the admission orifices of said chambers have their openings, said cavity being connected to a pipe for the supply of compressed fluid.

3. A pneumatic device in accordance with claim 1, characterized in that said chambers are annular and surround said cylindrical member externally thereof.

4. A pneumatic centering device in accordance with claim 3, wherein said radial partition walls are each provided with a terminal slot for limiting the expansion of the fluid as the fluid flows between compartments.

5. A pneumatic device in accordance with claim 1, characterized in tat said chambers are limited by the internal surface of said cylindrical member, said cavity being formed along the axis of said element.

6. A pneumatic device in accordance with claim 1, characterized in that said element is formed of at least one electric winding.

7. A pneumatic device in accordance with claim 6, characterized in that said winding is mounted on a cylindrical form.

8. A pneumatic device in accordance with claim 6, characterized in that the lead wires of said windings are connected to supply terminals within a separation box in which a pipe for the supply of said compressed fluid has its opening.